US006989040B2

(12) United States Patent
Zebrowski

(10) Patent No.: US 6,989,040 B2
(45) Date of Patent: Jan. 24, 2006

(54) RECLAIMED MAGNESIUM DESULFURIZATION AGENT

(75) Inventor: Gerald R. Zebrowski, Hudson, OH (US)

(73) Assignee: Gerald Zebrowski, Richfield, OH (US)

( * ) Notice: Subject to any disclaimer, the term of this patent is extended or adjusted under 35 U.S.C. 154(b) by 0 days.

(21) Appl. No.: 10/283,574

(22) Filed: Oct. 30, 2002

(65) Prior Publication Data

US 2004/0083851 A1 May 6, 2004

(51) Int. Cl.
*C21B 13/00* (2006.01)
*C21C 1/02* (2006.01)
*C21C 7/04* (2006.01)
*C22B 1/14* (2006.01)

(52) U.S. Cl. ............................. 75/315; 75/568; 75/770
(58) Field of Classification Search ................ 75/315, 75/327, 328, 329, 568, 570, 746, 770, 773, 75/546
See application file for complete search history.

(56) References Cited

U.S. PATENT DOCUMENTS

| | | |
|---|---|---|
| 2,299,043 A | 10/1942 | Stern |
| 2,358,667 A | 9/1944 | Stern |
| 2,852,418 A | 9/1958 | MacDonald |
| 2,863,764 A | 12/1958 | Spangler |
| 2,873,188 A | 2/1959 | Bieniosek |
| 3,486,745 A | 12/1969 | Eadler |
| 3,598,573 A | 8/1971 | Freissmuth et al. |
| 3,604,494 A | 9/1971 | Trager et al. |
| 3,637,373 A | 1/1972 | Bylund et al. |
| 3,656,735 A | 4/1972 | Eliot |
| 3,681,855 A | 8/1972 | Weisselberg et al. |
| 3,728,797 A | 4/1973 | Worden, Sr. et al. |
| 3,767,179 A | 10/1973 | Larson |
| 3,777,409 A | 12/1973 | Weisselberg et al. |
| 3,876,421 A | 4/1975 | Takemura |
| 3,929,464 A | 12/1975 | Todd et al. |
| 3,955,973 A | 5/1976 | Robinson |
| 3,957,502 A * | 5/1976 | Cull et al. .................... 75/315 |
| 3,961,663 A | 6/1976 | Degois et al. |
| 3,998,625 A | 12/1976 | Koros |
| 4,004,630 A | 1/1977 | Dunks |
| 4,004,919 A | 1/1977 | Wilson |
| 4,040,818 A | 8/1977 | Clegg et al. |
| 4,065,299 A | 12/1977 | Roberts et al. |
| 4,076,522 A | 2/1978 | Yoshida |
| 4,078,915 A | 3/1978 | Meichsner et al. |
| 4,086,086 A | 4/1978 | Dawson et al. |
| 4,137,072 A | 1/1979 | Kawakami et al. |
| 4,139,369 A | 2/1979 | Kandler et al. |
| 4,154,605 A | 5/1979 | Freissmuth et al. |

(Continued)

FOREIGN PATENT DOCUMENTS

CA          1 171 663          7/1984

(Continued)

OTHER PUBLICATIONS

*Case Histories Showing Why the Wyssmont TURBO-Dryer® is the Best;* Brochure CH9701 by Wyssmont Co., Inc., Fort Lee, New Jersey, no date.

(Continued)

Primary Examiner—Roy King
Assistant Examiner—Kathleen McNelis
(74) Attorney, Agent, or Firm—Fay Sharpe Fagan Minnich & McKee; Brian E. Turung; Robert V. Vickers

(57) ABSTRACT

A method and composition for removing sulfur from molten ferrous material, particularly molten iron. The desulfurization agent includes reclaimed magnesium scrap, a gas-producing compound and a calcium compound.

7 Claims, 1 Drawing Sheet

U.S. PATENT DOCUMENTS

| | | |
|---|---|---|
| 4,169,724 A | 10/1979 | Freissmuth et al. |
| 4,173,466 A | 11/1979 | McLaughlin et al. |
| 4,194,902 A | 3/1980 | Gmohling |
| 4,209,325 A | 6/1980 | Cooper et al. |
| 4,210,195 A | 7/1980 | McPherson |
| 4,224,069 A | 9/1980 | Shea et al. |
| 4,230,490 A | 10/1980 | Kessl |
| 4,260,413 A | 4/1981 | Freissmuth et al. |
| 4,266,969 A | 5/1981 | Koros |
| 4,279,643 A | 7/1981 | Jackman |
| 4,313,758 A | 2/1982 | Henning et al. |
| 4,315,773 A | 2/1982 | Freissmuth et al. |
| 4,326,701 A | 4/1982 | Hayden |
| 4,345,940 A | 8/1982 | Koros |
| 4,364,771 A | 12/1982 | Cordier et al. |
| 4,385,030 A | 5/1983 | Dremann |
| 4,395,282 A | 7/1983 | Braun et al. |
| 4,430,118 A | 2/1984 | Freissmuth et al. |
| 4,529,370 A | 7/1985 | Holmes et al. |
| 4,540,436 A | 9/1985 | Wolfsgruber et al. |
| 4,592,777 A | 6/1986 | Rellermeyer et al. |
| 4,600,434 A | 7/1986 | Kleimeyer et al. |
| 4,694,881 A | 9/1987 | Busk |
| 4,694,882 A | 9/1987 | Busk |
| 4,705,561 A | 11/1987 | Green |
| 4,708,737 A | 11/1987 | Skach, Jr. et al. |
| 4,764,211 A | 8/1988 | Meichsner et al. |
| 4,765,830 A | 8/1988 | Skach, Jr. et al. |
| 4,786,322 A | 11/1988 | Green |
| 4,832,739 A | 5/1989 | Meichsner et al. |
| 4,897,242 A | 1/1990 | Gut et al. |
| 4,900,375 A | 2/1990 | Alt et al. |
| 4,943,317 A | 7/1990 | Lischka et al. |
| 4,943,411 A | 7/1990 | Henych et al. |
| 5,021,086 A | 6/1991 | Luydkx et al. |
| 5,024,559 A | 6/1991 | Beuchel |
| 5,040,589 A | 8/1991 | Bradley et al. |
| 5,143,795 A | 9/1992 | Das et al. |
| 5,211,744 A | 5/1993 | Areaux |
| 5,242,480 A * | 9/1993 | Rebiere et al. ............... 75/312 |
| 5,259,442 A | 11/1993 | Clark |
| 5,338,335 A | 8/1994 | Saxena |
| 5,358,550 A | 10/1994 | Rossborough |
| 5,368,631 A * | 11/1994 | Rossborough et al. ........ 75/533 |
| 5,577,546 A | 11/1996 | Kjar et al. |
| 5,701,576 A | 12/1997 | Fujita et al. |
| 6,120,625 A | 9/2000 | Zhou |
| 6,352,570 B1 | 3/2002 | Bieniosek et al. |
| 6,372,014 B1 | 4/2002 | Bieniosek et al. |
| 6,770,115 B2 * | 8/2004 | Jackman ..................... 75/403 |

FOREIGN PATENT DOCUMENTS

| | | |
|---|---|---|
| EP | 467545 A2 * | 1/1992 |
| LU | 88 252 | 3/1994 |

OTHER PUBLICATIONS

*Recycling of Different Types of Mg-Scrap*—Gemot Macher, non ferrum Metallpulver Ges.mbh & Co KG, Gerhard Hanka, Helmut Antrekowitsch, Huberty Sommerhofer—Department of Non-Ferrous Metallurgy—Non-Ferrous Metallurgy University of Leoben Austria, no date.

Altek Brochure—*Briquetting Magnesium Chips*, no date.

Altek International Briquetting Press Brochure, no date.

* cited by examiner

RECLAIMED MAGNESIUM DESULFURIZATION AGENT

The present invention relates to a method of desulfurization of molten iron, and more particularly to a desulfurization agent that includes magnesium to desulfurize molten iron, and even more particularly to a desulfurization agent that includes reclaimed magnesium to desulfurize molten iron.

INCORPORATION BY REFERENCE

U.S. Pat. Nos. 3,598,573; 3,876,421; 3,929,464; 3,998,625; 4,078,915; 4,137,072; 4,139,369; 4,194,902; 4,266,969; 4,315,773; 4,345,940; 4,395,282; 4,592,777; 4,705,561; 4,708,737; 4,764,211; 4,765,830; 4,832,739; 5,021,086; 6,352,570; and 6,372,014; and Luxemburg Patent No. 88,252 are incorporated herein by reference as examples of desulfurization agents that could incorporate the use of the reclaimed magnesium of the present invention.

BACKGROUND OF THE INVENTION

The sulfur content in iron ores and other materials commonly used in pig-iron production, i.e. coal and coke, have increased the costs of steel making. As a result, it is becoming increasingly desirable to desulfurize the pig-iron before the iron enters the basic oxygen furnace and/or steel making furnace. In addition, specifications for the sulfur content of finished steel are decreasing to extremely low levels to make high strength low alloy steel, and steels resistant to hydrogen induced cracking, among other applications requiring low sulfur contents. In combination with the economic benefits of blast furnace operations producing molten pig-iron with increased sulfur contents, the desulfurization of molten pig-iron external to the blast furnace before the molten pig-iron enters the steel making furnace has become a practical necessity.

Over the years, a wide variety of materials and mixtures have been used to desulfurize pig-iron. It has long been known that various calcium compounds are good desulfurization agents. It has also been known that magnesium, alone or in combination with various alkaline metal oxides, is also a good desulfurization agent. There have been several patents which disclose the use of calcium oxide and magnesium as the primary desulfurization agents. (See Skach U.S. Pat. No. 4,765,830; Skach U.S. Pat. No. 4,708,737; Green U.S. Pat. No. 4,705,561; Kandler U.S. Pat. No. 4,139,369; Kawakami U.S. Pat. No. 4,137,072; Koros U.S. Pat. No. 3,998,625.) Furthermore, desulfurization agents disclosing the use of calcium carbide as the primary desulfurization agent have also been known and well documented. (See Freissmuth U.S. Pat. No. 3,598,573; Todd U.S. Pat. No. 3,929,464; Braun U.S. Pat. No. 4,395,282.)

The use of a desulfurization agent that includes magnesium and iron carbide or high carbon ferromanganese is disclosed in Luxemburg Patent No. 88,252 dated Jan. 3, 1999 and invented by Axel Thomas. The desulfurization agent disclosed in Thomas '252 includes a majority of iron carbide or high carbon ferromanganese. The desulfurization agent also includes magnesium, and one or more additives to improve the formed slag. The particles of iron carbide or high carbon ferromanganese are selected to be the same or slightly greater in size than the particles of magnesium. The particle sizes of the iron carbide or high carbon ferromanganese and magnesium range from 0.5 to 1 mm. As a result, the particles of iron carbide or high carbon ferromanganese do not coat the particles of magnesium, or vice versa. The iron carbide or high carbon ferromanganese and magnesium can be coated with titanium oxide to improve the fluidity of the particles and to slow the melting rate of the particles. The iron carbide or high carbon ferromanganese and magnesium can be mixed together prior to injection into the pig-iron or injected separately into the pig-iron.

The use of a calcium compound and/or magnesium, in combination with a gas-producing compound, has also been used to increase the amount of sulfur removal. It has been found that the gas-producing compound releases a gas upon contact with the molten pig-iron to create a turbulent environment within the molten pig-iron. The released gas primarily breaks down agglomerations of the desulfurization agent and disperses the desulfurization agent throughout the molten pig-iron. The gas-producing agent is typically a hydrocarbon, carbonate or alcohol which has a tendency to release various amounts of gas upon contact with the molten pig-iron. Use of these various gas-producing agents is well documented. (See Takmura U.S. Pat. No. 3,876,421; Meichsner U.S. Pat. No. 4,078,915; Gmohling U.S. Pat. No. 4,194,902; Koros U.S. Pat. No. 4,266,969; Freissmuth U.S. Pat. No. 4,315,773; Koros U.S. Pat. No. 4,345,940; Green U.S. Pat. No. 4,705,561; Rellermeyer U.S. Pat. No. 4,592,777; Meichsner U.S. Pat. No. 4,764,211; Meichsner U.S. Pat. No. 4,832,739; and Luyckx U.S. Pat. No. 5,021,086.)

The use of compounds to increase the desulfurization efficiencies of magnesium particles are disclosed in Bieniosek U.S. Pat. No. 6,352,570 and Bieniosek U.S. Pat. No. 6,372,014. High melting temperature particles are combined with and/or coated onto the magnesium particles to delay the melting of the magnesium particles.

Desulfurization agents can contain various slag-forming agents. The importance of the slagging agent generally has been passed over for more immediate concerns about the economics of using various ingredients of the desulfurization agent. The composition of the slag can be important to retain the removed sulfur within the slag and not allow the sulfur to re-enter the molten pig-iron. Various slagging agents have been used for various purposes. In U.S. Pat. Nos. 4,315,773 5,021,086, fluorspars are used to modify the characteristics of the slag produced during the desulfurization process.

Many of the above described desulfurization agents remove the desired amount of sulfur and other impurities from molten iron. However, in an industry constantly driven by margins, there remains a need for a more cost effective desulfurization agent. The magnesium component of the desulfurization agent is typically the highest-cost component. Domestically refined primary magnesium powder can cost up to $1.80/lb. As a result, there has been some interest in using magnesium scrap. Magnesium scrap is available from rejected and process scrap in the form of machined chips which are common in the automobile and electronics industry. Magnesium metal is commonly machined using mineral oil and oil/water emulsions resulting in waste magnesium chips and cutting fluid. The cutting fluid can constitute up to 35–50 weight percent of the waste material. The magnesium chip/cutting fluid mixture typically cannot be disposed of due to the reactivity of magnesium with water. The large volume of cutting fluid in the magnesium chip/cutting fluid mixture increases the transportation costs of the mixture. Due to the transport costs and/or processing problems of the magnesium chip/cutting fluid mixture, the mixture is commonly burned instead of being reclaimed.

Some progress has been made concerning the recovery of magnesium from a magnesium chip/cutting fluid mixture.

Several of these processes are disclosed in U.S. Pat. Nos. 2,299,043; 2,358,667; 3,656,735; 3,767,179; and 5,338,335. In these processes, the water and oil in the magnesium chip/cutting fluid mixture is burnt off in a rotary kiln. The substantially oil free magnesium chips are then remelted and formed and/or extruded into a final product. Solvents may be used to separate a portion of the cutting fluid from the magnesium chips prior to drying the magnesium chips. Although these processes are successful in reclaiming magnesium, the energy costs associated with the heating of the magnesium chip/cutting fluid mixture have not resulted in a cost effective process. Combustion problems remain with the drying of the magnesium chips resulting in higher recovery costs. In addition, the oxidation of the magnesium during the drying process accounts for a significant loss of magnesium being reclaimed. Additional losses are encountered when using a solvent prior to drying.

Another process for reclaiming magnesium from a magnesium chip/cutting fluid mixture is by pressing the mixture together to form a magnesium puck or briquette. This process can reduce the cutting fluid content of puck or briquette to about 7%. The squeezed out cutting fluid can be recycled and the transport costs of the magnesium in the form of a puck or briquette is significantly reduced. In addition, due to the low cutting fluid content of the puck or briquette, the puck or briquette can be more safely transported in such form. Furthermore, the compression process is less costly than processing utilizing a heated rotary kiln. Although the compression process has several cost advantages, the cutting of fluid content of up to 7% poses problems for further processing of the compressed magnesium chips. Smelting of the magnesium pucks or briquettes is not feasible because of extreme flame and emissions generation. As a result, magnesium pucks or briquettes have not been accepted in the industry. In addition, the magnesium pucks or briquettes could not be disposed of in land fills due to environmental and safety concerns.

In view of the present state of technology, there is a need for a lower cost and effective desulfurization agent that can utilize reclaimed magnesium from a magnesium chip/cutting fluid mixture.

SUMMARY OF THE INVENTION

The present invention relates to an improved desulfurization agent and method of desulfurization of molten ferrous materials such as, but not limited to, molten pig-iron, ferro-silicon alloy, etc., wherein the desulfurization agent includes reclaimed magnesium to desulfurize molten iron. Typically, the desulfurization agent is a solid material at least at ambient temperature (i.e. 70° F.). The solid desulfurization agent is formulated to maintain its solid form until at least just prior to being combined with the molten iron, such as molten pig-iron. The desulfurization agent is also formulated to at least partially react with and/or at least partially remove sulfur from molten iron. The desulfurization agent is further selected to minimize the introduction of undesired materials, such as sulfur, into the molten iron during the desulfurization process. The desulfurization agent includes a calcium compound, magnesium, and a gas-producing compound. In one embodiment of the present invention, calcium compound is selected to readily react with sulfur in the molten iron. The calcium compound can be a single calcium compound or a combination of two or more calcium compounds. In one aspect of this embodiment, various calcium compounds can be used such as, but not limited to, calcium carbide, calcium carbonate, calcium chloride, calcium cyanamide, calcium iodide, calcium nitrate and/or calcium nitrite. In one non-limiting formulation, the calcium compound primarily includes calcium oxide, calcium carbonate, and/or calcium carbide. In another and/or alternative non-limiting formulation, the calcium compound is primarily calcium oxide. In another and/or alternative aspect of this embodiment, the calcium compound constitutes at least about 1 weight percent of the desulfurization agent. In one non-limiting formulation, the calcium compound constitutes at least about 5 weight percent of the desulfurization agent. In another and/or alternative non-limiting formulation, the calcium compound constitutes at least about 10 weight percent of the desulfurization agent. In still another and/or alternative non-limiting formulation, the calcium compound constitutes at least about 25 weight percent of the desulfurization agent. In yet another and/or alternative non-limiting formulation, the calcium compound constitutes at least about 30 weight percent of the desulfurization agent. In another and/or alternative embodiment of the present invention, the magnesium includes pure magnesium, a magnesium alloy and/or a magnesium compound. In one aspect of this embodiment, the magnesium is primarily pure magnesium metal. In another and/or alternative aspect of this embodiment, the magnesium constitutes at least about 5 weight percent of the desulfurization agent. In one non-limiting formulation, the magnesium constitutes at least about 20 weight percent of the desulfurization agent. In another and/or alternative non-limiting formulation, the magnesium constitutes at least about 40 weight percent of the desulfurization agent. In still another and/or alternative non-limiting formulation, the magnesium constitutes a majority weight percent of the desulfurization agent. In yet another and/or alternative non-limiting formulation, the magnesium constitutes over 50 weight percent to about 90 weight percent of the desulfurization agent. In still another and/or alternative embodiment of the present invention, the gas-producing compound is selected to enhance the desulfurization efficiencies of the desulfurization agent. The gas-producing compound forms a gas upon contact with molten iron. The produced gas at least partially mixes the various components of the desulfurization agent throughout the iron to facilitate in enhancing the reaction between the various desulfurization agents and the sulfur in the molten iron. The produced gas can also facilitate in the breakup, mixing, and dispersement of the desulfurization agent in the molten iron so as to facilitate in increasing the active sites available for reaction with the sulfur, thereby further increasing the efficiency of sulfur removal from the molten iron. In one aspect of this embodiment, the gas-producing compound includes water, hydrocarbons, alcohols, and/or carbonates. In another and/or alternative aspect of this embodiment, the gas-producing compound can be a liquid and/or a solid material. In one non-limiting formulation, the gas-producing material includes a solid compound such as, but not limited to, coal, plastic, rubber, solid hydrocarbons, solid alcohols, solid nitrogen containing compounds, solid esters and/or solid ethers. In another and/or alternative non-limiting formulation, the gas-producing material includes a liquid compound such as, but not limited to, liquid hydrocarbons. The liquid hydrocarbon can be saturated or unsaturated, halogenated or unhalogenated. In still another and/or alternative aspect of this embodiment, the gas-producing compound constitutes at least about 0.1 weight percent of the desulfurization agent. In one non-limiting formulation, the gas-producing compound constitutes at least about 1 weight percent of the desulfurization agent. In another and/or alternative non-limiting formulation, the gas-producing compound constitutes at least about 3 weight percent of the desulfurization agent. In still another and/or alternative non-limiting formulation, the gas-producing compound constitutes at least about 4 weight percent of the desulfurization agent. In yet another and/or alternative non-limiting formulation, the gas-producing compound constitutes up to about 10 weight percent of the desulfurization agent.

In another and/or alternative aspect of the present invention, the desulfurization agent includes magnesium that has been at least partially reclaimed from magnesium scrap. In one embodiment of the present invention, a majority of the magnesium of the desulfurization agent is reclaimed from magnesium scrap. The magnesium scrap can be derived form a variety of sources. One common source is the automotive industry where many automotive components such as motors, gear boxes, steering wheel, etc. are made of or include magnesium; however, many other industries also generate magnesium scrap that can be used in the present invention. It is estimated that over a million tons of magnesium scrap are generated by the automotive industry per year. Much of this magnesium scrap is mixed with oil and/or water. The oil and/or water functions as lubricant during the shaping and/or cutting of the magnesium during the formation of various components. Various prior art process have been developed to recycle magnesium scrap that includes oil. Several of these processes are disclosed in U.S. Pat. Nos. 2,299,043; 2,358,667; 3,656,735; 3,767,179; and 5,338,335, which are incorporated herein by reference. In these processes, the water and oil in the magnesium chip/cutting fluid mixture are thermally removed such as by burning off the oil in a heated rotary kiln. The substantially oil-free magnesium chips are then remelted and formed and/or extruded into a final product. Although these processes are successful in reclaiming magnesium which can be used in the present invention, the energy costs associated with the heating of the magnesium chip/cutting fluid mixture have not resulted in a cost effective process. Indeed, the costs associated with use of reclaimed magnesium from such processes are typically higher than the costs of obtaining mined magnesium. Consequently, such reclaimed magnesium is presently not an economically viable substitute for mined magnesium. Another process for reclaiming magnesium from a magnesium chip/fluid mixture is by briquetting the magnesium chips. Such a process is disclosed by Altek International. The briquetting process includes the use of a device that compresses magnesium chips, turnings and the like that include oil and/or water into briquettes. In addition to the use of a press to form magnesium briquettes, some of the fluid can be separated from the magnesium chip by cycloning the mixture. As can be appreciated, the use of a cyclone is not required. In addition and/or alternatively, the mixture can be heated and/or treated with solvents to at least partially separate the fluid from the magnesium chips. The use of heat and/or solvents can result in prohibitably increased costs to the reclamation of the magnesium. The briquettes can have a variety of shapes and sizes. One non-limiting shape and size of a magnesium briquette is a cylindrically shaped briquette having a radius of about 1–6 inches and a height of about 1–5 inches; however, other sizes and shapes can be formed. The briquetting process can reduce the oil and/or water content of the magnesium chip/fluid mixture. Commonly the fluid constitutes 25–50 weight percent of the magnesium chip/fluid mixture. The briquetting process can form a magnesium briquette that includes less than about 15 weight percent fluid, and typically about 1–10 weight percent fluid, more typically about 2–8 weight percent fluid, and even more typically about 3–7 weight percent fluid. For instance, a magnesium chip/fluid mixture that includes about 25 weight percent fluid has a bulk density of about 7 lbs/ft$^3$. Using a briquetting process can form a magnesium briquette having a bulk density of about 103 lbs/ft$^3$. As a result about 1485 liters of fluid can be recovered by processing 20,000 lbs of magnesium chip/fluid mixture. The recovered fluid can be recycled and the shipping costs for the briquetted magnesium can be reduced. The cost per pound of magnesium in a reclaimed briquette form is less than the cost per pound of refined primary magnesium. However, the briquette form of the reclaimed magnesium still includes up to 15 weight percent oil and/or water. Irrespective of the fluid content of the magnesium briquette, the present invention can utilize such magnesium briquettes in the desulfurization agent of the present invention. In another and/or alternative embodiment of the present invention, the fluid content of the puck or briquette of reclaimed magnesium partially or fully constitutes the gas-producing compound of the desulfurization agent. The water and/or oil in the puck or briquette vaporizes when in contact with the molten iron. The vaporized water and/or oil at least partially mixes with the various components of the desulfurization agent throughout the molten iron to facilitate in enhancing the reaction between the various desulfurization agent and the sulfur in the molten iron. In one aspect of this embodiment, the water and/or oil in the puck or briquette of magnesium fully constitutes the gas-producing compound of the desulfurization agent. In another and/or alternative aspect of this embodiment, the water and/or oil in the puck or briquette of magnesium partially constitutes the gas-producing compound of the desulfurization agent. As such, an additional gas-producing compound is added to the desulfurization agent to obtain the desired amount of mixing of the various components of the desulfurization agent throughout the molten iron.

In still another and/or alternative aspect of the present invention, the puck or briquette of magnesium is further processed to enhance the desulfurization efficiencies achieved with use of the reclaimed magnesium and/or to enhance the ease and/or effectiveness of using the reclaimed magnesium. Although the puck or briquette of magnesium can be directly added to the molten iron, when using the pucks or briquettes of magnesium, the sulfur removal efficiencies of the magnesium in the molten iron are reduced due to lower dispersion of the magnesium and the reduced surface area of the magnesium per volume of magnesium. In order to addresses these problems associated with the use of pucks or briquettes of magnesium, the pucks or briquettes of magnesium are further processed by grinding the pucks or briquettes of magnesium into smaller pieces. The smaller pieces of the reclaimed magnesium increases the surface area of the magnesium, thereby improving the desulfurization efficiencies of the reclaimed magnesium. In one embodiment of the present invention, the pucks or briquettes of magnesium are crushed and/or ground to an average particle size of about 14 to about 325 U.S. Standard Mesh, and typically about 18 to about 100 U.S. Standard Mesh, more typically about 18 to about 50 U.S. Standard Mesh, and even more typically about 18 to about 30 U.S. Standard Mesh. In one aspect of this embodiment, a calcium compound is added to the pucks or briquettes of magnesium subsequent to and/or during the crushing and/or grinding of the pucks or briquettes of magnesium. In another and/or alternative aspect of this embodiment, a calcium compound is added to the pucks or briquettes of magnesium after the pucks or briquettes of magnesium have been crushed and/or ground. In one non-limiting innovation, the subsequently added calcium compound is crushed and/or ground with the previously ground and/or crushed magnesium. In another and/or alternative non-limiting innovation, the subsequently added calcium compound is not crushed and/or ground with the previously ground and/or crushed magnesium. In still another and/or alternative non-limiting innovation, the average particle size of the calcium compound is less than about 12 U.S. Standard Mesh, typically about 14 to about 500 U.S. Standard Mesh, more typically about 14 to about 325 U.S. Standard Mesh, still more typically less than about 14 U.S. Standard Mesh, yet even more typically about 16 to about 200 U.S. Standard Mesh, even more typically about 16 to about 100 U.S. Standard Mesh, still even more typically less than about 14 U.S. Standard Mesh, and still yet even more typically about 18 to about 100 U.S. Standard Mesh. In one particular non-limiting aspect, the average size of the calcium compound is less than or about the same as the average particle size of the magnesium. In still another and/or alternative non-limiting innovation, the calcium compound is selected so as to absorb at least a portion of the fluid contained in the pucks or briquettes of magnesium and/or be at least partially coated with the fluid contained in the pucks or briquettes of magnesium. The absorption and/or coating of the calcium compound of the fluid results in better dispersion of the fluid in the molten iron which can result in improved desulfurization efficiencies. In addition and/or alternatively, the absorption and/or coating of the calcium compound of the fluid can facilitate in the transport and/or fluidization of the desulfurization agent during the feeding of the desulfurization agent into the molten iron. The absorbed fluid will have less tendency to further agglomerate the desulfurization agent during transport and/or fluidization and/or to adhere to the walls of a pipe and/or lance during transport and/or fluidization. Furthermore and/or in addition, the absorption and/or coating of the calcium compound of the fluid can facilitate in reducing caking and/or agglomeration of the desulfurization agent during storage. Typically, the calcium compound is selected which does not adversely react with the absorbed liquids and/or magnesium. One such calcium compound is calcium oxide; however, other calcium compounds can be used. In a non-limiting process for manufacturing the desulfurization agent of the present invention, magnesium scrap (e.g. secondary turings, post consumer scrap, etc.) is processed to reduce the liquid content (e.g. oil, water, solvents, etc.) from the magnesium scrap. It is not uncommon for the metal scrap to include up to about 50 weight percent liquid. The liquid content can be removed by a variety of one or more processes (e.g. heating, solvent treating, centrifuging, compressing, etc.). The liquid content of the magnesium scrap is typically reduced to less than about 15 weight percent, and more typically less than about 10 weight percent. The magnesium scrap is then combined with a calcium compound, and is then used as a primary desulfurization agent, a component of a desulfurization system, and/or a co-injected component of a desulfurization system. The desulfurization agent can be immediately used or stored for later use. As can be appreciated, many modifications can be made to this basic process. One modification is that purer forms of magnesium are added during the processing of desulfurization agent. For instance, a purer form of magnesium is added to the magnesium scrap after the liquid levels have been reduced in the magnesium scrap. As can be appreciated, the purer form of magnesium can be added at additional or other processing steps for the desulfurization agent (e.g. prior to liquid removal step). Another and/or additional modification is that the reduced liquid magnesium scrap is ground to a smaller size prior to the addition of the calcium compound. For example, when the magnesium scrap is compressed into a briquette or puck, the briquette or puck is chopped, crushed, and/or ground into smaller pieces. Still another and/or alternative modification is that the calcium compound is co-ground with the magnesium scrap. The co-grinding can be the first or a subsequent grinding of the magnesium scrap. Typically, the co-grinding of the calcium compound and the magnesium scrap reduces the mixture to the desired particle size for insertion into molten metal. During the co-grinding process, the calcium compound is coated with and/or absorbs at least a portion of the liquid associated with the magnesium scrap. Yet another and/or alternative modification is that an additional gas-producing compound is added to increase the volatility content of the desulfurization agent. The additional gas-producing compound can be added at one or more processing steps (e.g., grinding of magnesium scrap, co-grinding of magnesium scrap and calcium compound, addition after grinding steps, etc.). Still yet another and/or alternative modification is that a calcium compound is added after the grinding steps. In another non-limiting process for manufacturing the desulfurization agent of the present invention, the desulfurization is processed the same as above, but a purer form of magnesium (e.g. magnesium processed from magnesium ore, etc.) is used instead of magnesium scrap. For example, the purer form of magnesium is ground to a smaller size and then a calcium compound is added and subsequently co-ground with the purer form of magnesium. Alternatively, the calcium compound is added to the purer form of magnesium and the mixture is then co-ground. The purer form of magnesium includes little, if any, liquids; thus the liquid reducing step can be eliminated. A gas-producing compound is added prior to the grinding of magnesium, during the grinding of the magnesium, prior to the co-grinding of the magnesium and calcium compound, during the co-grinding of the magnesium and calcium compound, and/or after the co-grinding of the magnesium and calcium compound.

In yet another and/or alternative aspect of the present invention, the desulfurization agent is at least partially coated with a heat absorbing compound. The heat absorbing compound is formulated to absorb heat around the desulfurization agent. In one embodiment of the present invention, the heat absorbing compound is formulated to absorb heat about and/or closely adjacent to the desulfurization agent to increase the time the desulfurization agent remains in the molten iron for reaction with sulfur. In another and/or alternative embodiment of the present invention, the desulfurization agent is pre-coated with the heat absorbing compound or coated with the heat absorbing compound just prior to being added to the molten iron. In one aspect of this embodiment, the desulfurization agent is sufficiently coated with the heat absorbing compound to reduce the rate of or prevent the vaporization of the desulfurization agent prior to the desulfurization agent reacting with a significant amount of sulfur in the molten iron. In still another and/or alternative embodiment of the present invention, the weight percentage of the desulfurization agent that is coated with the heat absorbing compound particles is greater than the weight percentage of the particles of the heat absorbing compound that is directly on the desulfurization agent particle. In one aspect of this embodiment, the particle size of the desulfurization agent is larger than the average particle size of the heat absorbing compound. In one non-limiting design, the average particle size of the desulfurization agent which is coated is at least two times greater than the average particle size of the heat absorbing compound that is coated onto a particle of desulfurization agent. In another and/or alternative non-limiting design, the average particle size of the desulfurization agent is about 2–1000 times the maximum particle size of the heat absorbing compound. In still another and/or alternative non-limiting design, the average particle size of the desulfurization agent is generally up to about 1.5 mm, and typically about 0.2–1 mm, and more typically about 0.5–1 mm. In yet another and/or alternative non-limiting design, the average particle size of the heat absorbing compound used to coat the particles of the desulfurization agent is up to about 0.5 mm, and typically up to about 0.25 mm, and more typically up to about 0.18 mm, even more typically up to about 0.15 mm, and still even more typically up to about 0–11 mm. In still yet another and/or alternative non-limiting design, the average weight percentage of the desulfurization agent particle which is coated with particles of the heat absorbing compound is about 50–99 weight percent of the sum of the weights of the desulfurization agent and heat absorbing compound. In still another and/or alternative aspect of this embodiment, at least about 10 percent, and typically the majority of the surface, of the desulfurization agent particle is covered by the heat absorbing compound. In one non-limiting design, the heat absorbing compound constitutes at least about 1 weight percent of the coated desulfurization particle, typically at least about 2 weight percent, and more typically about 2–30 weight percent. In still another and/or alternative embodiment of the present invention, the particles of heat absorbing compound can form a blend and/or conglomeration with a single or a plurality of particles of desulfurization agent. In one aspect of this embodiment, the weight percentage of the heat absorbing compound is greater than the weight percentage of the heat absorbing compound on non-conglomerated coated desulfurization agent particles. In one non-limiting design, the weight percentage of the heat absorbing compound particles of a conglomeration is up to about 70 weight percent. In yet another and/or alternative embodiment of the present invention, the heat absorbing compound includes solid carbide compounds and/or ferroalloys. The carbide compound and/or ferroalloy is typically solid at ambient temperatures, and more typically, remains solid at least until just prior to being combined with the molten iron, such as molten pig-iron. The carbide compound and/or ferroalloy is selected to at least partially absorb heat away from the desulfurization agent to thereby increase the residence time of the desulfurization agent in the molten iron. The carbide compound and/or ferroalloy can also act as a catalyst for the sulfur reactions between the sulfur and the desulfurization agent. In one aspect of this embodiment, the carbide compound and/or ferroalloy has a higher melting point than the desulfurization agent. In still another and/or alternative aspect of this embodiment, the carbide compound and/or ferroalloy endothermically reacts and/or disassociates in the molten iron, thereby absorbing heat. The higher melting temperature carbide compound and/or ferroalloy and/or endothermically reacting and/or disassociating carbide compound and/or ferroalloy draws and/or absorbs heat around the carbide compound and/or ferroalloy. The heat absorbing feature of the heat absorbing compound results in a reduced amount of heat affecting the coated desulfurization agent particle for a period of time. This period of time of reduced heat reduces the rate the desulfurization agent vaporizes and bubbles out of the molten iron. Molten pig-iron typically has a temperature of at least 1140° C. Magnesium has a melting point of about 649° C. and a boiling point of about 1107° C. The heat absorbing compound is formulated to reduce the rate of melting of the desulfurization agent, which includes magnesium, in the coated desulfurization agent particle and the rate at which the desulfurization agent begins to boil, vaporize, and/or react in the molten iron. In one-non-limiting design, the carbide compounds and/or ferroalloys include, but are not limited to, iron carbide and/or high carbon ferromanganese. In still yet another and/or alternative embodiment of the present invention, at least a portion of the particles of heat absorbing compound are at least partially bonded to the particle surface of the desulfurization agent by a bonding agent. The bonding agent can also assist in the flowability of the coated desulfurization agent particles. The bonding agent can include a number of compounds that can assist in the bonding of the heat absorbing compound particles to the surface of the desulfurization agent particles and/or form blends and/or conglomerations of heat absorbing compound particles and desulfurization agent particles. In one aspect of this embodiment, the bonding agent is selected so as to not introduce adverse materials to the molten iron, such as sulfur. In one non-limiting formulation, the bonding agent includes, but is not limited to, polyhydric alcohols, polyhydric alcohol derivatives, and/or silicon compounds.

In accordance with still yet another and/or alternative aspect of the present invention, the desulfurization agent is injected into molten iron by a lance. The melting of the components of the desulfurization agent in the transport pipe of the lance is inhibited or overcome by mixing the desulfurization agent with and/or including in the desulfurization agent high melting temperature particles. The high melting temperature particles are designed to absorb heat as the high melting temperature particles and the magnesium particles are transported through the lance and into the molten iron. The absorption of heat by the high melting temperature particles inhibits or prevents the components of the desulfurization agent from melting or completely melting prior to being injected into the molten iron. By inhibiting the melting of the components of the desulfurization agent in the lance, the problems associated with plugging of the lance are reduced or overcome. In one embodiment of the present invention, the high melting temperature alloy particles are made up of two or more of the following metals, namely, aluminum, antimony, beryllium, boron, calcium, chromium, copper, iron, magnesium, manganese, nickel, rare earth metals, silicon, silver, sodium, strontium, tin, titanium, vanadium, zinc, zirconium, and mixtures thereof. The specific composition of the high melting temperature particles is selected to obtain the desired heat absorbing characteristics of the particles when used in combination with the magnesium particles. The specific composition of the high melting temperature particles is also typically selected to minimize contamination of the molten iron. In another and/or alternative embodiment, the average melting temperature of the high melting temperature particles is about 2200° F.

In accordance with still a further and/or alternative aspect of the present invention, a secondary calcium compound is co-injected with the desulfurization agent to assist in the removal of sulfur from the molten iron. The secondary calcium compound is selected to react with sulfur in the molten iron. Various calcium compounds can be used such as, but not limited to, calcium oxide, calcium carbide, calcium carbonate, calcium chloride, calcium cyanamide, calcium iodide, calcium nitrate, diamide lime, and calcium nitrite. In one embodiment of the present invention, the secondary calcium compound disassociates and the calcium ion forms in the molten iron so as to be available to react with the sulfur. The secondary calcium compound may or may not have a melting point which is less than the temperature of the molten iron. In another and/or alternative embodiment of the present invention, the secondary calcium compound is selected such that the ions previously associated with the calcium ion do not adversely affect the desulfurization process. In one aspect of this embodiment, the secondary calcium compound includes calcium oxide, and/or calcium carbide. In still another and/or alternative embodiment of the present invention, the particle size of secondary calcium compound is selected to provide the necessary reactivity or activity of the secondary calcium compound with the sulfur in the molten iron. When the particle size is too large, fewer calcium ions will be produced, resulting in poorer desulfurization efficiencies. In one aspect of this embodiment, the particle size of the secondary calcium compound is an average particle size of about 14 to about 500 U.S. Standard Mesh, typically about 14 to about 325 U.S. Standard Mesh, more typically about 16 to about 200 U.S. Standard Mesh, even more typically about 16 to about 100 U.S. Standard Mesh, still even more typically about 18 to about 100 U.S. Standard Mesh, and yet even more typically about 18 to about 50 U.S. Standard Mesh.

In accordance with yet a further and/or alternative aspect of the present invention, a slag-improvement agent is added to and/or co-injected with the desulfurization agent to generate a more fluid slag and/or to reduce the amount of liquid iron entrapped within the slag. Various slag-improvement agents can be used such as, but not limited to, metallurgical and/or acid grade fluorspar, dolomitic lime, silica, sodium carbonate, sodium chloride, potassium chloride, potash, cryolite, potassium cryolite, colemanite, calcium chloride, calcium aluminate, sodium fluoride, anhydrous borax, nepheline syenite, and/or soda ash. In one embodiment, a metallurgical and/or acid grade fluorspar is used such as, but not limited to, calcium fluoride. Metallurgical and/or acid grade fluorspar causes desired modifications to the physical properties of the slag. The amount of slag-improvement agent is selected to improve the slag characteristics without unduly reducing the viscosity of the slag, whereby the sulfur can easily transfer back into the molten iron.

In accordance with still yet a further and/or alternative aspect of the present invention, the desulfurization agent is injected beneath the surface of the molten iron, such as molten pig-iron. The desulfurization agent can be injected such that the coated desulfurization agent is injected by itself into the molten iron, injected with other components of the desulfurization agent, or co-injected with other components of the desulfurization agent. In one embodiment of the present invention, the components of the desulfurization agent are fluidized prior to being injected into the molten iron. In one aspect of this embodiment, the desulfurization agent is fluidized in a semi-dense state before being injected into the molten iron. The fluidized desulfurization agent is carried into the molten iron by a carrier gas. In another and/or alternative aspect of this embodiment, the carrier gas is inert and/or non-oxidizing to the components of the desulfurization agent. Carrier gases that can be used include, but are not limited to, argon, nitrogen, helium, natural gas or various other inert and/or non-oxidizing gases.

The primary object of the present invention is the provision of a desulfurization agent that increases the efficiency of desulfurization of iron.

Another object of the present invention is the provision of a desulfurization agent which forms a slag that retains sulfur compounds formed during desulfurization.

Still another and/or alternative object of the present invention is the provision of a desulfurization agent that includes a desulfurization agent to remove sulfur from the molten iron.

Yet another and/or alternative object of the present invention is the provision of a desulfurization agent which includes a heat absorbing compound that reduces the rate of vaporization of the desulfurization agent in the molten iron.

Still yet another and/or alternative object of the present invention is the provision of a desulfurization agent which includes particles of desulfurization agent coated with particles of a heat absorbing compound.

A further and/or alternative object of the present invention is the provision of a desulfurization agent which includes a gas-producing or volatile producing compound that releases a gas when in contact with molten iron.

Still a further and/or alternative object of the present invention is the provision of a desulfurization agent which includes a calcium and/or carbide compound to remove sulfur from the molten iron.

Yet a further and/or alternative object of the present invention is the provision of a desulfurization agent which includes a slag-improvement agent to improve the slag characteristics of the slag on the surface of the molten iron.

Still yet a further and/or alternative object of the present invention is the provision of a desulfurization agent which is injected beneath the surface of the molten iron.

Another and/or alternative object of the present invention is the provision of a desulfurization agent that includes and/or is co-injected with high melting temperature particles to inhibit or prevent the melting of the component of the desulfurization agent prior to the desulfurization agent being combined with the molten ferrous material.

Still another and/or alternative object of the present invention is the provision of a desulfurization agent that includes reclaimed magnesium.

Yet another and/or alternative object of the present invention is the provision of a desulfurization agent that includes reclaimed magnesium and a gas-producing compound.

These and other objects of the invention will become apparent to those skilled in the art upon reading and understanding the following detailed description of preferred embodiments taken together with the drawing.

BRIEF DESCRIPTION OF THE DRAWING

The invention may take physical form in certain parts and arrangement of parts, preferred embodiments of which will be described in detail and illustrated in the accompanying drawing which forms a part hereof and wherein.

DESCRIPTION OF THE PREFERRED EMBODIMENTS

Figure 1:
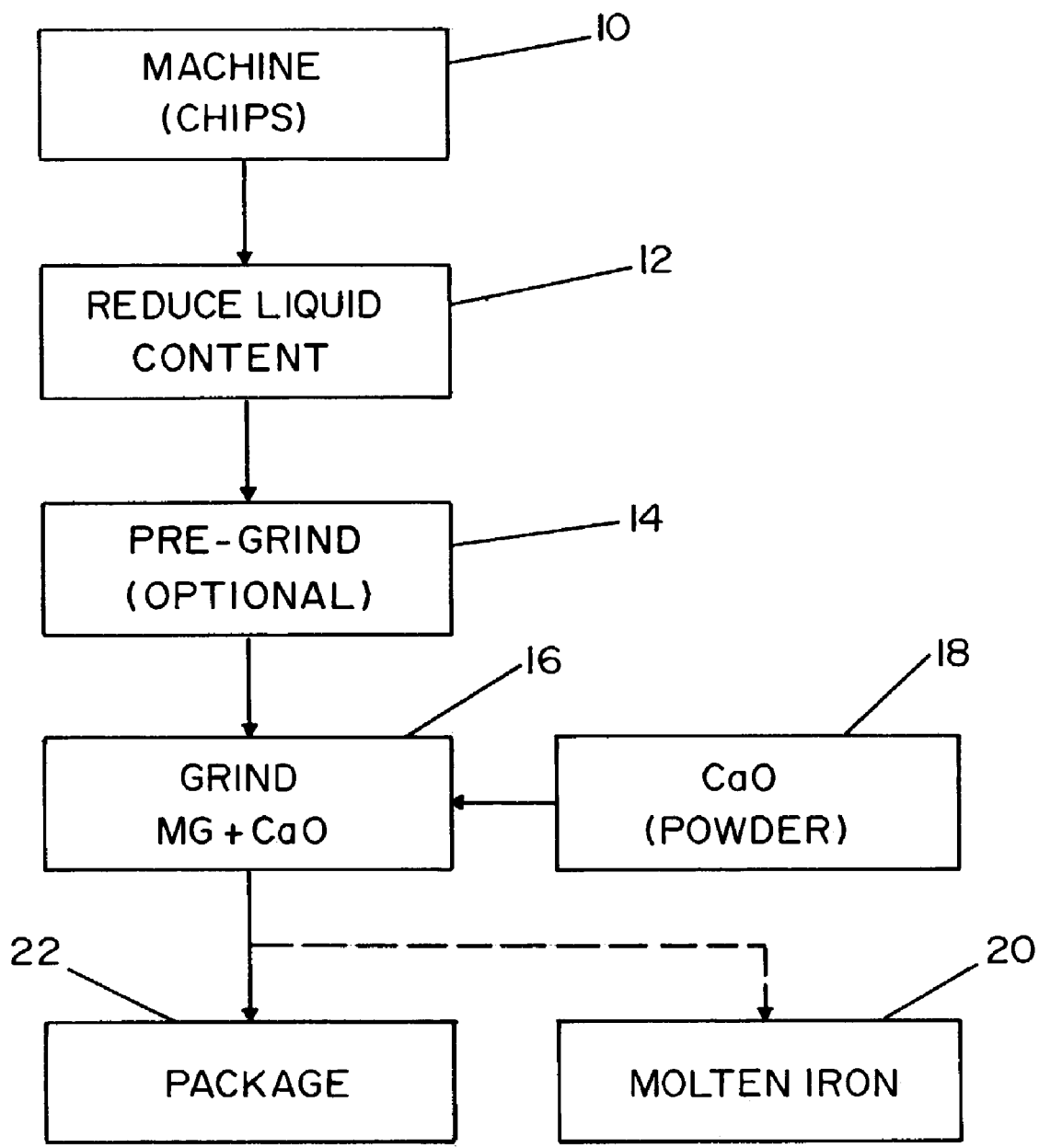
FIG. 1 is a flow chart illustrating the forming of a desulfurization agent from reclaimed magnesium scrap.

Referring to the drawing, wherein the showing is for the purpose of illustrating the preferred embodiment of the invention only and not for the purpose of limiting same, FIG. 1 illustrates the process for manufacturing a desulfurization agent from reclaimed magnesium scrap. Heretofore, there has not existed an economical method for reclaiming magnesium scrap for use in an industrial process, much less reclaiming magnesium scrap for use in a desulfurization process.

The demand for magnesium continues to grow in popularity as a substitute for steel and aluminum products. As more products are produced with magnesium, the amount of magnesium scrap has correspondingly increased. Magnesium metal is commonly machined with the use of cutting fluids. The cutting fluids are typically used to increase the life of the cutting tools. As a result, the magnesium scrap from such processes constitutes a mixture of magnesium turnings or chips and cutting fluid. The cutting fluid commonly includes mineral oil, water and other lubricants. The mixture of magnesium and cutting fluid has posed significant handling and recycling problems due to the volume and weight of the mixture, and the instability of the mixture. One process used to reclaim the magnesium is to draw off as much cutting fluid as possible, such as by a centrifuge, and then remove the remaining cutting fluid by solvents and/or heating. The resulting magnesium is then remelted to be formed into other products. The costs associated with this reclamation process typically exceed the costs of obtaining and processing the magnesium from ore. As a result, this reclamation process has not gained widespread commercial acceptance. Another magnesium reclamation process involves drawing off as much cutting fluid as possible, such as by a centrifuge, and then compressing the magnesium and remaining cutting fluid to form a puck or briquette that includes about 3–8 weight percent cutting fluid. Although this reclamation process is less costly than other reclamation processes, the cutting fluid content of the puck or briquette results in processing problems when the puck or briquette is remelted. As a result, the formation of a magnesium puck or briquette has also not gained commercial acceptance. The desulfurization agent of the present invention utilizes the puck or briquette of magnesium to form a new and effective desulfurization agent. As a result, the present invention creates a commercial market for the pucks or briquettes of magnesium.

Referring now to FIG. 1, machine chips 10 are collected from various manufacturers. These machine chips typically are mixed with various amounts of machining or cutting lubricant. It is not uncommon that the fluid content of the mixture of magnesium chips and cutting fluid is up to about 48 weight percent. Typically, the cutting fluid includes oil and water. The machine chips of magnesium are processed to reduce the cutting fluid content. This process step can be accomplished at or close to the manufacturing facility that generates the magnesium chips, or at some remote location. To reduce transportation costs, the magnesium chips are processed on-site or at a site close to the manufacturer. The process for reducing the cutting fluid content 12 can involve one or more steps. Typically, the process does not involve the use of solvents and/or heat to reduce the amount of cutting, fluid, since such processes significantly increase the costs of recovering the magnesium. One process involves the straining and/or centrifuging of the magnesium chips until the desired amount of cutting fluid has been removed. Another process involves the compacting of the magnesium chips to form puck or briquettes of magnesium. Still another process involves an initial step of straining and/or centrifuging the magnesium chips to remove an initial amount of cutting and fluid, and subsequently compressing the chips together to further reduce the cutting fluid content and to form a magnesium puck or briquette. The recovered cutting fluid can be resold to offset some of the costs associated with reclaiming the magnesium. One non-limiting specific process for reducing the cutting fluid content of the recycled magnesium chips involves first conveying the magnesium chips to a cyclone separator. The magnesium chips can be pneumatically conveyed and/or conveyed by other means. The cyclone separator initially removes cutting fluid and other liquids from the magnesium chips. After passing through the cyclone, separator, the magnesium chips are fed into a briquetter. The briquetter compresses the magnesium chips to form a round or polygonal briquette. A round briquette is commonly referred to as a puck. One type of briquetter that can be used is manufactured by Altek International of Exton, Pa. The density of the magnesium briquette is about 80–100 lbs/ft$^3$ and has a fluid content of less than about 10 weight percent, and typically about 3–8 weight percent. The fluid reclaimed in the formation of the magnesium briquette can be resold. The magnesium in a briquette form is easier and safer to handle, thus reducing transport costs. Indeed, briquetting of the magnesium can result in a reclassification of the magnesium chips from a hazardous material to a non-hazardous material.

Once the cutting fluid content of the magnesium chips has been reduced, the chips 14 can be pre-ground and/or crushed to a generally uniform size. This pre-grinding step is optional. When the magnesium chips have been formed into a briquette or puck during, the reduction of liquid process, the briquettes or pucks are typically pre-ground to a smaller size prior to further processing. Typically, the chips are ground to an average particle size of about 0.1 to about 0.75 inch; however, other sizes can be used.

The magnesium chips can be further processed by co-grinding the magnesium 16 with a calcium compound such as calcium oxide. During the co-grinding process, the magnesium and calcium compound are reduced in size. Typically, the ground size of the magnesium and calcium compound is such that the mixture can be pneumatically injected into molten iron 20 (e.g. about 18–100 U.S. Standard Mesh). The grinding of the calcium compound with the magnesium also results in the calcium compound being at least partially coated with and/or absorbing a portion of the fluid remaining in the magnesium.

Once the calcium compound and magnesium compound are finished being co-ground, the mixture forms the desulfurization agent of the present invention. The desulfurization agent thus includes reclaimed magnesium, at least one calcium compound, and a low weight percentage of cutting fluid. The cutting fluid is a gas-producing agent, since such cutting fluid volatilizes upon contact with the molten iron. This three-component desulfurization agent is less costly that past desulfurization agents due to the costs savings associated with the use of the reclaimed magnesium that includes a gas-producing agent. The desulfurization agent has been found to effectively remove sulfur from molten iron. In addition, the desulfurization agent helps to resolve an environmental problem associated with past magnesium scrap. The desulfurization agent can then be packaged 22, inserted into a hopper for later addition with molten iron, or immediately added to molten iron. As can be appreciated, the desulfurization agent can be mixed with other components, and/or co-injected with other components prior to being inserted into the molten iron.

The calcium compound is formulated to react with sulfur in the molten iron to form calcium sulfide in the slag layer. Typically, the desulfurization agent is added to pig-iron; however, the molten iron can be other types of iron. The particles of calcium compound which do not react with sulfur migrate into the slag lager. The magnesium and cutting fluid immediately vaporize upon contact with the molten iron to form magnesium vapor bubbles and primarily hydrogen, hydrocarbon bubbles, and/or water vapor. The vapor bubbles create turbulence in the molten iron as the vapor bubbles migrate up through the molten iron and through the slag layer. The turbulence caused by the vapor bubbles increases the sulfur removal efficiency by the desulfurization agents.

The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations in so far as they come within the scope of the appended claims.

Having thus described the invention, it is claimed:

1. A desulfurization agent for removing sulfur from molten iron including magnesium, a gas-producing compound and a calcium compound, at least a majority of said magnesium in the form of reclaimed magnesium, said reclaimed magnesium at least partially formed from ground particles of a briquette or puck of magnesium scrap, said ground particles having an average particle size of about 18–100 Mesh, said ground particles including 1–15% liquid, said liquid including said gas-producing compound, said gas-producing compound including lubrication fluid, cutting fluid, water or mixtures thereof, said calcium compound including calcium oxide, calcium carbide, calcium carbonate, calcium chloride, calcium cyanamide, calcium iodide, calcium nitrate or mixtures thereof, said reclaimed magnesium including pure magnesium, a solid magnesium compound, a magnesium alloy or mixtures thereof, said gas-producing compound constituting about 0.1–10 weight percent of said desulfurization agent, said calcium compound constituting at least about 1 weight percent of said desulfurization agent, said magnesium constituting at least about 5 weight percent of said desulfurization agent.

2. A method for forming a desulfurization agent comprising:
   a) obtaining a magnesium material, at least a portion of said magnesium material being reclaimed magnesium;
   b) forming said reclaimed magnesium into a compressed briquette or puck by removing fluid from magnesium chips, magnesium turnings or mixtures thereof and compressing the magnesium chips, magnesium turnings or mixtures thereof into said compressed briquette or puck having a density of at least about 80 lbs/ft$^3$ and a fluid content of about 1–10 weight percent, said liquid including a gas-producing compound, said gas producing compound including lubrication fluid, cutting fluid, water or mixtures thereof;
   c) grinding said magnesium material to form particles having an average particle size of about 18–100 Mesh; and,
   d) mixing a calcium compound with said magnesium material, said calcium compound at least partially coated with said liquid in said particles of briquette or puck as said calcium compound is mixed with said magnesium material.

3. The method as defined in claim 2, including the step of at least partially co-grinding said magnesium material and said calcium compound to form a desulfurization agent having an average particle size of about 18–100 Mesh.

4. The method as defined in claim 2, wherein said calcium compound constitutes at least about 1 weight percent of said desulfurization agent, said calcium compound including calcium oxide, calcium carbide, calcium carbonate, calcium chloride, calcium cyanamide, calcium iodide, calcium nitrate or mixtures thereof.

5. The method as defined in claim 3, wherein said calcium compound constitutes at least about 1 weight percent of said desulfurization agent, said calcium compound including calcium oxide, calcium carbide, calcium carbonate, calcium chloride, calcium cyanamide, calcium iodide, calcium nitrate or mixtures thereof.

6. The method as defined in claim 2, wherein said desulfurization agent includes about 0.1–10 weight percent gas-producing compound, at least about 1 weight percent calcium compound, and at least about 5 weight percent magnesium material.

7. The method as defined in claim 5, wherein said desulfurization agent includes about 0.1–10 weight percent gas-producing compound, at least about 1 weight percent calcium compound, and at least about 5 weight percent magnesium material.

* * * * *